(12) United States Patent
Schuft et al.

(10) Patent No.: US 7,870,547 B2
(45) Date of Patent: Jan. 11, 2011

(54) METHOD AND APPARATUS FOR MANAGING PATCHABLE SOFTWARE SYSTEMS

(75) Inventors: Ryan J. Schuft, Tyngsboro, MA (US); Thomas N Cobb, Bedford, MA (US); Manjunatha N. Ramanathpura, Cambridge, MA (US); Paul J Russell, Clinton, MA (US); Christopher S Warren, Chelmsford, MA (US)

(73) Assignee: Cisco Technology, Inc., San Jose, CA (US)

( * ) Notice: Subject to any disclaimer, the term of this patent is extended or adjusted under 35 U.S.C. 154(b) by 1034 days.

(21) Appl. No.: 11/201,959

(22) Filed: Aug. 10, 2005

(65) Prior Publication Data
US 2007/0038991 A1   Feb. 15, 2007

(51) Int. Cl.
*G06F 9/44* (2006.01)
(52) U.S. Cl. ........................................ 717/168; 717/126
(58) Field of Classification Search ......... 717/168–178, 717/126
See application file for complete search history.

(56) References Cited

U.S. PATENT DOCUMENTS

| | | | |
|---|---|---|---|
| 5,790,856 A * | 8/1998 | Lillich | 717/163 |
| 6,243,766 B1 | 6/2001 | Sliger et al. | |
| 6,367,075 B1 * | 4/2002 | Kruger et al. | 717/169 |
| 6,381,742 B2 * | 4/2002 | Forbes et al. | 717/176 |
| 6,477,703 B1 | 11/2002 | Smith et al. | |
| 6,735,757 B1 | 5/2004 | Kroening et al. | |
| 6,859,923 B2 * | 2/2005 | Taylor | 717/172 |
| 6,938,109 B1 | 8/2005 | Sliger et al. | |
| 6,954,928 B2 * | 10/2005 | Allsop et al. | 717/168 |
| 7,185,332 B1 * | 2/2007 | Waldin et al. | 717/170 |
| 7,343,599 B2 * | 3/2008 | Panjwani | 717/168 |
| 7,386,846 B2 * | 6/2008 | Rajaram | 717/173 |
| 2002/0100036 A1 * | 7/2002 | Moshir et al. | 717/173 |
| 2003/0218628 A1 | 11/2003 | Deshpande et al. | |
| 2003/0220992 A1 | 11/2003 | DiRico | |
| 2004/0003390 A1 * | 1/2004 | Canter et al. | 717/178 |
| 2004/0015946 A1 | 1/2004 | Te'Eni et al. | |
| 2004/0230828 A1 | 11/2004 | DeFuria et al. | |
| 2005/0050538 A1 * | 3/2005 | Kawamata et al. | 717/168 |

(Continued)

OTHER PUBLICATIONS

Brandman, George; "Patching the Enterprise", QUEUE, Mar. 2005, 8pg.*

(Continued)

*Primary Examiner*—Wei Y Zhen
*Assistant Examiner*—Ryan D Coyer
(74) *Attorney, Agent, or Firm*—Hamilton, Brook, Smith & Reynolds, P.C.

(57) ABSTRACT

A method or corresponding apparatus manages deployment of a software patch ("patch") by creating a given patch comprising at least one file and associating information with the given patch that prevents other patches from being installed over the given patch. In one some embodiments, patches are no longer delivered directly from a software engineer to a customer. Instead, the software engineer works with a patch manager that, among other tasks, may track a state of software on the customer's machine, allowing for installing another patch without producing adverse effects that may be caused by installing over the given patch. To install another patch, software on the customer's machine is set into a known state by uninstalling the given patch. Once in the known state, the other patch may be installed.

19 Claims, 3 Drawing Sheets

U.S. PATENT DOCUMENTS

| | | | |
|---|---|---|---|
| 2005/0071838 A1* | 3/2005 | Hatasaki | 717/168 |
| 2005/0257208 A1* | 11/2005 | Blumfield et al. | 717/168 |
| 2006/0020938 A1* | 1/2006 | Elcock et al. | 717/178 |
| 2006/0048129 A1* | 3/2006 | Napier et al. | 717/168 |
| 2006/0048130 A1* | 3/2006 | Napier et al. | 717/168 |
| 2006/0048131 A1* | 3/2006 | Napier et al. | 717/168 |
| 2006/0130040 A1* | 6/2006 | Subramanian et al. | 717/168 |
| 2007/0033635 A1 | 2/2007 | Hirsave et al. | |
| 2007/0169073 A1* | 7/2007 | O'Neill et al. | 717/168 |

OTHER PUBLICATIONS

Hudepohl et al., "Emerald: Software Metrics and Models on the Desktop"; IEEE, 1996, 5pg.*

* cited by examiner

METHOD AND APPARATUS FOR MANAGING PATCHABLE SOFTWARE SYSTEMS

BACKGROUND OF THE INVENTION

A "patch" or "software patch", in the context of patchable software systems, has two meanings. One meaning is a verb that refers to adding, modifying, or removing files or settings on a system via a program designed and tested to run on a target machine. The second meaning is a noun that refers to the aforementioned program itself as the delivery mechanism for the change described in the first meaning. Both meanings are relevant to the descriptions herein.

The word "deliverable" is used to refer to files or settings contained within a given patch. System state, state (by itself), or target machine state all refer to a describable set of files and settings on a given system or target machine. Uncontrolled change in a system refers to any modification of state that removes the ability of a patch to determine a system or target machine's state. Any reference to system is intended to mean a collection of files or settings spanning one or more target machines (e.g., servers or computers).

Patching an existing system typically involves establishing a known state of operation on the target machine. That means one knows the state of all files and settings that may be impacted by the patch prior to applying or removing the patch to maintain a consistently running software system or product. Adding any change "manually" to a system (i.e., without a programmatic interface for detecting or controlling those changes) places the system in an unknown state. That makes the addition of a patch potentially unsafe because the files being patched may have been added, altered, or removed from the expected system on which the patch is designed to run and may have been tested in the same context.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
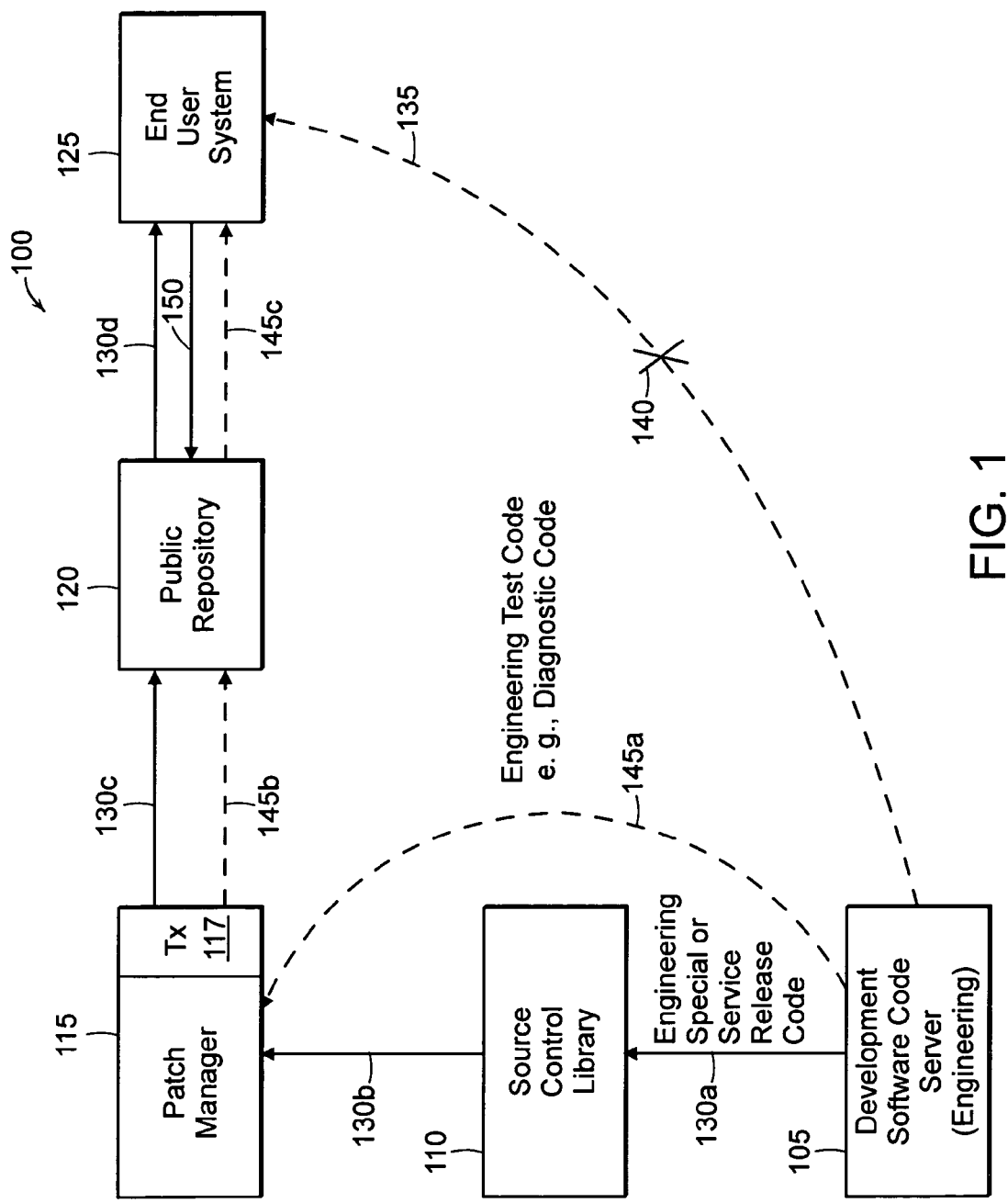
FIG. 1 is a block diagram of a computer network employing an embodiment of the present invention.

A description of preferred embodiments of the invention follows.

A method or corresponding apparatus manages deployment of a given software patch ("patch") by creating the given patch, which includes at least one file, and associating information with the given patch that prevents other patches from being installed over the given patch. In preferred embodiments, the information does not prevent the given patch from being installed over other patches that are not specified to be treated in such a manner. The given patch may be a "temporary patch" since a temporary patch is generally specified as a type of patch that should not have another patch installed over it without being uninstalled first. Details of temporary patches and the process of uninstalling/installing are presented below in reference to FIGS. 1-3. It should be understood that descriptions using the term temporary patches also apply to patches more generally.

The given patch may be a controlled deliverable patch in a sense that it is version controlled through a standard quality review process or other form of "official release" process prior to being constructed as a deliverable patch. Examples below may be presented in reference to a controlled deliverable patch, but it should be understood that such examples apply to patches more generally. A controlled deliverable patch may also bypass a standard quality review process or other form of official release process and simply have its contents or information about itself recorded in a standard manner so that a state of a receiving computer remains known. Such a patch is different from an uncontrolled patch that may be emailed or otherwise sent directly from an engineer to a customer without going through an intermediate quality assurance process or otherwise recorded in an official manner.

The temporary patch may include diagnostic software or temporary software to correct software errors in a software program. The diagnostic software or temporary error correction software is also referred to herein as "engineering test" software. A temporary patch or (e.g., engineering test patch) is distinguished from "engineering special" patch (unscheduled release) and a "service release" patch (scheduled) in that the latter two patches are expected to be maintained by the software developer in the future.

Using an embodiment of the present invention, temporary patches are no longer delivered directly from a software engineer to a customer. Instead, the software engineer works with a programmatic interface, referred to herein as a "patch manager," for detecting or controlling changes in a software system or patches that, among other tasks, tracks a state of software on the customer's machine. The patch manager's tracking may be used to allow installing other software patches without producing adverse effects that may be caused by installing a given patch over a temporary patch. To install the given patch, software on the customer's machine is set into a known state by uninstalling the temporary patch. Once in the known state, the given patch may be installed.

In practice, the temporary patch may be delivered to the patch manager, which then forwards it directly to the customer's machine or to an interface, such as a public repository for downloading by the customer's machine.

The patch manager may maintain a record of the temporary software patch, archive the temporary software patch, or maintain a state of a patchable software system into which the temporary patch is installed (i.e., the software system on the customer's machine). The patch manager or temporary patch itself may facilitate uninstalling of the temporary patch to allow for future installation of another patch.

An embodiment of the invention provides a mechanism to control an addition of one or more changes to a system, via a software patch ("patch"), that causes the system to reject any additional patching until the temporary patch is removed from the system. This allows the files and settings of the target system to return to a known state after adding change(s) that would, prior to the use of the invention, be introduced to the target system outside of a controlled software patch development path, leaving the system potentially unpatchable and potentially leading to undesired or unexpected behavior of the system. Such a result may occur if the patch is designed and tested against a different collection of files or settings. Patches according to an embodiment of the present invention have an ability to determine state in order to programmatically apply rules that govern installation, modification of a system or target machine, or removal of the patch.

The term "engineering test" or "ET" refers to a type of patch that exhibits the above behavior. This name stems from a specific usage, namely the addition of diagnostic software code, for example, to a system where the software code is expected to be removed prior to any additional patching of the system. However, its usage herein is intended to refer to more than one specific implementation requiring a type of deliverable within the patch.

Engineering test patches (i.e., temporary patches) may differentiate themselves from other types of patches (e.g., "engineering special" patches and "service release" patches) such as by leaving enough information about themselves on the target system for any patches applied after the ET to detect that an ET is installed and block the progression of installation until the ET is removed. An embodiment of the present invention includes a mechanism for "flagging" or notifying a system that it is in an unknown state in a way that is detectable by other patches. This mechanism replaces manually intervening with a system in any way that alters its state to the extent that a patch is unable to operate with a system in the context in which it is designed and tested. The following text illustrates a flow of file or setting state in an example implementation (with singular capital letters indicating a file or setting):

Base system (as expected by a non-ET patch):
A B
After installation of ET patch:
A B E
Installation of non-ET patch fails (state remains the same):
A B E
After removal of ET patch:
A B
Install of non-ET patch succeeds:
A B C This example shows the file state changes between two possible patches, both making use of an embodiment of the invention. The embodiment includes a mechanism that causes the installation of the non-ET patch (i.e., patch C) to fail. In this embodiment, the second patch, patch C, detects the ET patch, patch E, and stops. In another embodiment, the ET patch, patch E, itself may block installation of the second patch, patch C, without the logic present in the second patch. In yet another embodiment, the software system receiving the second patch, patch C, has an installation manager or driver that has logic preventing overwriting of the ET patch, patch E, without uninstalling the ET patch. In yet a further embodiment, the logic resides remotely from an end user system, such as in a public repository from which a patch is downloaded, and the process of uninstalling the ET patch, patch E, and installing another patch, such as patch C, is also controlled from the remote location.

Uncontrolled change is thus prevented, resulting in a safer and more reliable patching system. The act of installing a patch is automatically safeguarded against placing the target machine into an unknown and potentially unpatchable state. Any software product producing patches that rely on specific machine state to reliably and repeatedly install may make use of embodiments of the present invention.

Patching software running on embedded systems, such as networking equipment, is becoming very important. Many network service providers seek such capabilities. In patching, there is use for keeping track of what version is running and allowing for customers to work more closely with engineers in trying out new patches/functionality.

Software using one embodiment of the present invention is able to detect experimental software code and does not allow further patches to be installed. In this way, testing by engineers can occur without adversely affecting machine operation by installing future software or patch updates.

Some fixes cannot be verified locally because the environment causing a problem to occur cannot be reproduced in a laboratory for one reason or another. In such circumstances, an engineer may need to provide the customer with non-production software code that gives extra information unavailable in the production software code. A preferred way to install and later remove this software code is to bundle it as a temporary or test patch, but unlike a normal patch, this temporary patch cannot be merged into a main source branch (i.e., development release process) and is not compatible with later patches. The temporary patch may be intended as a temporary diagnostic tool.

In a patch manager system, engineering test patches (which are not to become part of a software product and are not to be maintained, version controlled, and so forth) behave almost the same as "engineering special" patches (which are to become part of a software product and are to be maintained, version controlled, and so forth) with some important differences:

Engineering test patches are not created from files that come from a release team's build system. The files that are bundled into an engineering test patch are uploaded by the engineer working on the patch. This allows the engineer to compile the files in any environment needed, with any unusual build configuration required.

As a result, software control library branches are not directly involved in the creation of an engineering test patch the way they are for engineering special patches. Once the engineer's request for a patch is approved, the engineer may move directly to uploading the file(s); no build from "release engineering" is necessary.

Once an engineering test patch is installed on a system, no further patches of any kind, in some embodiments, may be installed until the engineering test patch is uninstalled.

An engineering test patch cannot be merged into a service release or a maintenance release, which are routine releases of software that include updated software or engineering special patches released since the previous service or maintenance release.

Upon completion of an engineering test patch, Corporate Defect Tracking System (CDETS) records for any associated software bugs are not updated.

As a result of this CDETS non-update, there is no way a customer can get an engineering test patch unless the developers provide it.

With those exceptions, an engineering test patch behaves just like an engineering special patch.

FIG. 1 is a block diagram of a network 100 in which an embodiment of the present invention is employed. The network 100 includes a development software code server 105, a source control library 110, a patch manager 115 with a transmitter (Tx) 117, a public repository 120, and an end user system 125. The development code server 105, source control library 110, patch manager 115, and public repository 120 may all be part of an internal network for a software company that is providing software and software patches or service releases to the end user system 125.

In an embodiment, the development software code server 105 may be a location where software engineers develop software code as part of routine improvements to software or in response to requests by an end user. The source control library 110 may be a location where software generated by the software engineers is transferred via a communications path 130*a* for storage and version control or other control reasons.

The patch manager 115 receives source code or other forms of software code from the source control library 110 via a communications path 130*b*. The patch manager 115 provides many types of functions in this embodiment, such as bundling software from the source control library 110 into an archive (i.e., creating a patch) that can be transferred, via the transmitter 117, for deployment at a network node, such as the end user system 125, and installed in the end user system 125. The archive may include a compressed representation of a patch or multiple patches.

The public repository 120 receives archives or other forms of software from the patch manager 115 via a communications path 130*c*. The public repository 120 serves as an interface between the patch manager 115 and the end user system 125, allowing the end user to obtain the archives or other forms of software from the company.

There are occasions where the end user contacts engineers directly and states a problem occurring in the end user system 125. In response to such a request, the engineer may develop software code (e.g., an engineering test patch) for diagnosing a problem in the end user system 125 or for fixing a software error in the end user system 125. Traditionally, the engineer sends the engineering test software to the end user system 125 via a network path 135 other than via the path 130*a*-130*d* normally taken by version controlled software. The network path 135 may include path(s) via a wide area network (not shown), such as the Internet.

A problem with such "unregulated" dealings with an end user is that the end user system 125 then has engineering test software that is unknown to the patch manager 115, which knows the state of software that has been delivered to the end user system 125 through the regular course of updating software. Such unregulated dealings can cause problems in the future because the state of the software on the end user system 125 is unknown. Updating or patching such unregulated software can cause problems on many levels as is understood in the art. Therefore, in an embodiment of the present invention, the communications path 135 is discontinued, as represented by an "X" 140.

A path that the engineering test code takes in the embodiment of the present invention illustrated in FIG. 1 is through the patch manager 115. In this way, the patch manager 115 can include information (e.g., flag, number, status indicator, name of patch or files in the patch, and so forth), which can be deployed in the end user system 125, in a deliverable archive that may also include the temporary patch, which may include engineering test software. The information may be used to prevent future patch updates from overwriting the software or patch with the engineering test code. By preventing future patch updates from overwriting the engineering test code, the software in the end user system 125 is not adversely affected by having intermediate engineering test software installed in the software system between the previous software, or patch, update and the next software or patch update.

The process for forwarding the engineering test code to the end user system 125 via this new process according to an embodiment of the present invention is from the development code server 105 to the patch manager 115 via a communications path 145*a*. This communications path 145*a* bypasses the source control library 110 because the engineering test code is not software that is expected to be maintained in the future. From the patch manager 115, the engineering test code may travel to the public repository 120 via the communications path 130*c* previously described or a different communications path 145*b*. Similarly, the engineering test code may be transmitted from the public repository 120 to the end user system 125 via the communications path 130*d* previously described or a different communications path 145*c*.

Figure 2:
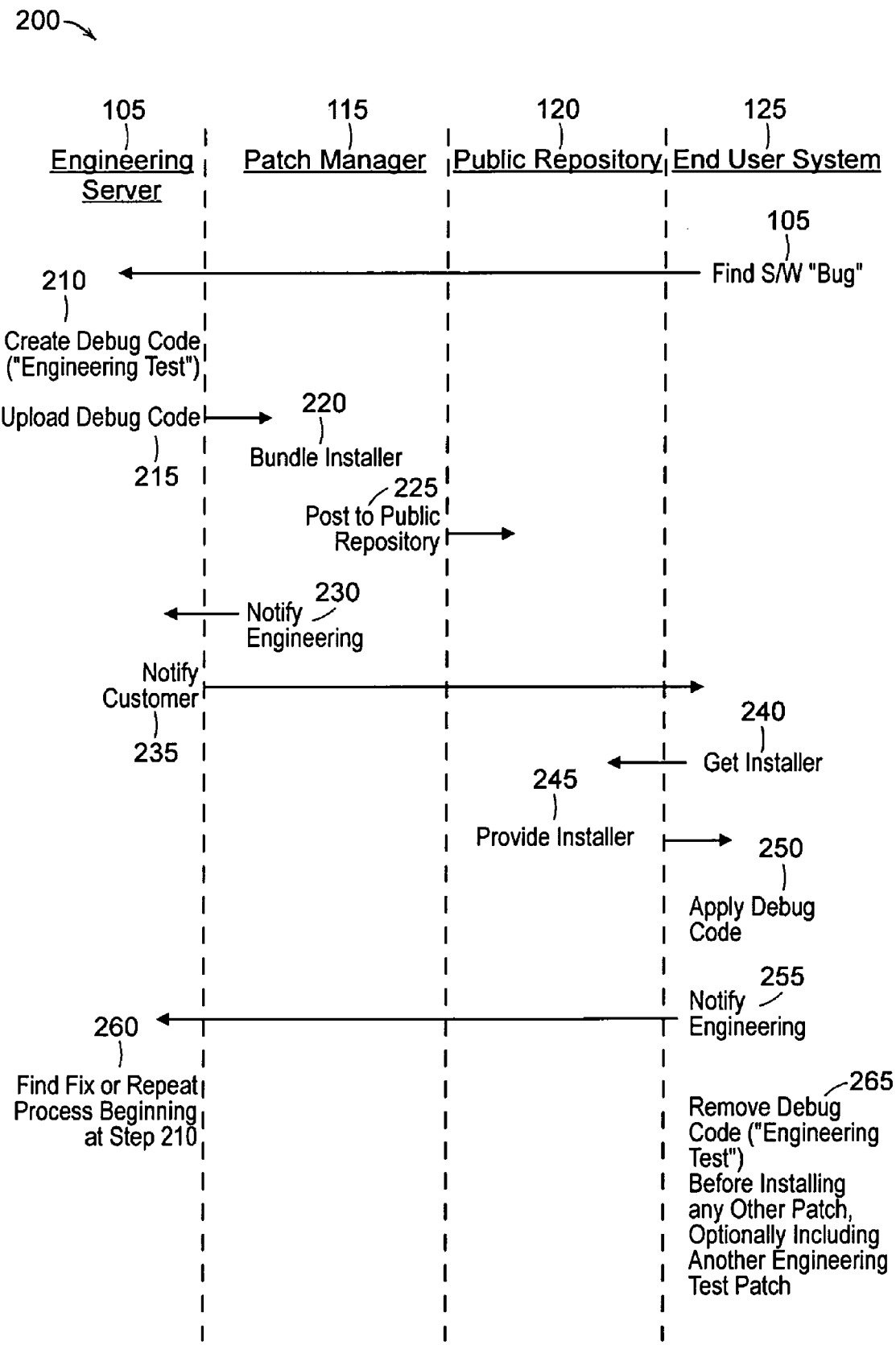
FIG. 2 is a flow diagram of an embodiment of a process used in the network of FIG. 1.

FIG. 2 is a communications diagram in which the engineering server 105, patch manager 115, public repository 120, and end user system 125 are represented along with various communications among these devices. The process 200 starts with the end user finding a software "bug" (step 205). The end user, optionally via the end user system 125, contacts the engineer, optionally via the engineering server 105, to request a correction for the software bug. The engineer creates debug (i.e., engineering test) code (step 210). The engineer, via the engineering server 105, uploads the debug code (step 215) to the patch manager 115.

The patch manager 115 bundles the debug code in an installer (step 220). The patch manager then posts the installer to the public repository 120 (step 225). The patch manager 115 also notifies engineering via the engineering server 105 that the installer has been posted to the public repository 120 (step 230). When the engineer receives notice, the engineer notifies the customer that the installer has been posted to the public repository 120 (step 235). The end user receives a communication of this type at the end user system 125. Thereafter, the end user system 125 retrieves the installer (step 240) from the public repository 120.

The public repository 120 provides the installer to the end user system in response to the-request (step 245). The end user system 125 applies the debug software code (step 250), which is then used to help debug the software system determined to contain a "bug" previously identified by the end user (step 205). Following application of the debug code (step 250), the end user system notifies the engineer (step 255). The engineer uses the engineering server 105 to find a fix to the software bug or repeat the process of creating further debug code, uploading the new debug code to the patch manager 115, and so forth (step 260).

At some point in the future, the end user system 125 removes the patch with the debug code before installing any other software patch (step 265), including, in one embodiment, another temporary software patch. In this way, the state of the software is returned from a state of having an engineering test software code to a known state that is able to be updated through the standard processes provided by the software company and, specifically, by way of the patch manager 115, which allows the end user system 125 to continue working in a known and error-free manner.

To inhibit updating the end user system 125 with a new patch while the engineering test patch is present, the patch manager 115 provides the archive it generates with a flag or information that is written to a register, registry, or other location, preferably either in the end user system 125 or in a system associated with the end user system 125, known to be inspected by, for example, an installer/uninstaller, prior to an installation of a future patch. The flag or information can be of a known value, type, or state that inhibits overwriting of a patch containing an engineering test software or can be of an unknown value, type, or state that, when found to be unknown, also inhibits overwriting. For example, a name associated with the engineering test patch may be stored in a registry. The name itself may indicate to an inspecting future patch or installation program that the engineering test patch should not be overwritten or the name stored may not be recognized by the inspecting future patch or installation program and have the same inhibiting effect.

Figure 3:
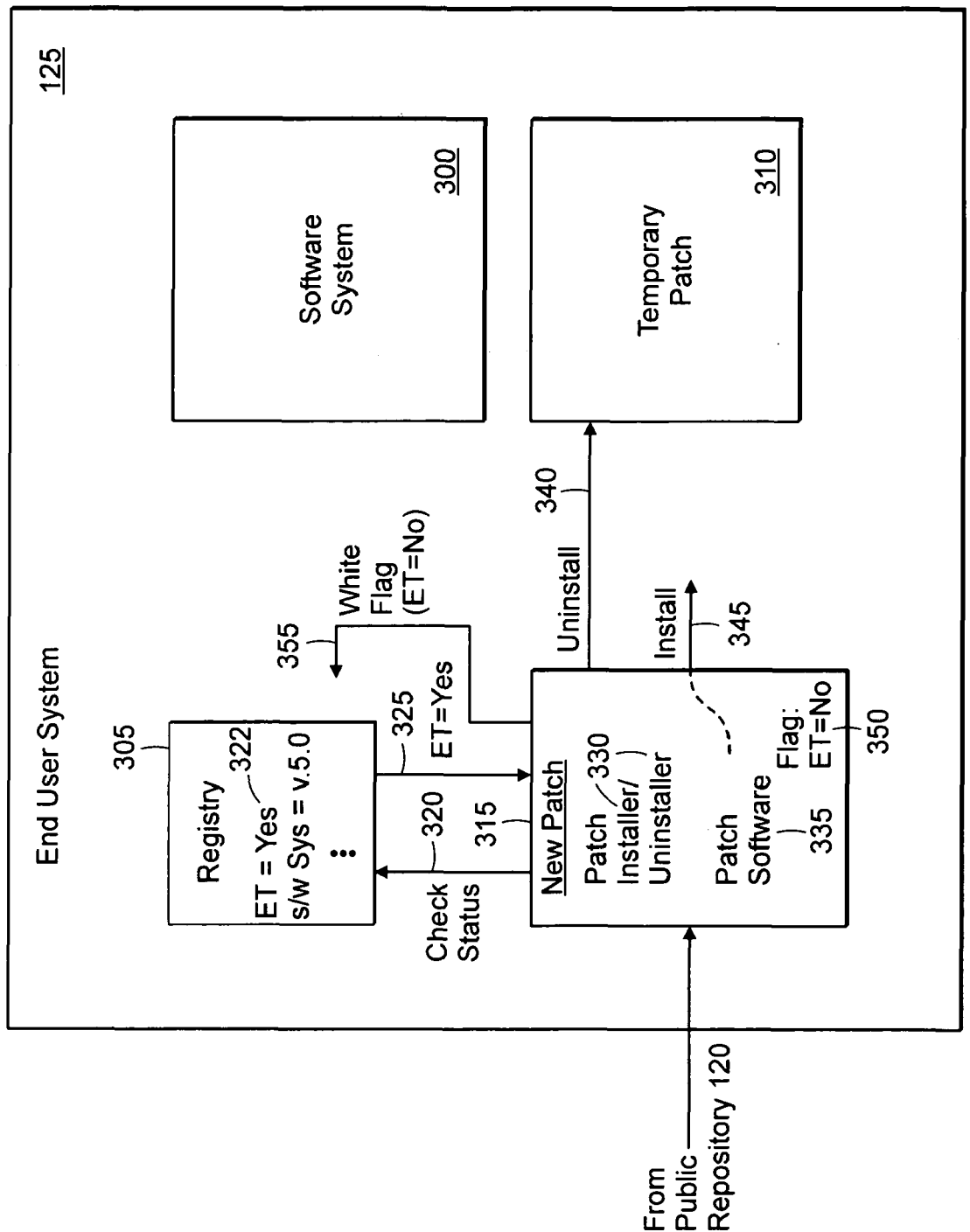
FIG. 3 is a block diagram of an end user system in the computer network of FIG. 1 illustrating a process of an embodiment of the present invention.

FIG. 3 is a block diagram of the end user system 125 and an example embodiment associated with determining whether a previously provided patch, in this case a temporary patch 310, being used by the software system 300, can be overwritten or must first be uninstalled. After a new patch 315 is received from the public repository 120, an installer/uninstaller 330 in the new patch 315 uses logic to check the status (step 320) of a flag 322 in a registry 305 at the end user system 125. In the example, the flag 322 is ET=Yes, which is an indication that the previously provided patch 310 is a temporary patch that includes engineering test software and is not to be overwritten without being installed, which is reported back to the installer/uninstaller 330 (step 325). Responsively, the installer/uninstaller 330 in the new patch 315 uninstalls the temporary patch 310 (step 340).

After uninstalling the temporary patch 310, the installer/uninstaller 330 installs new patch software 335 (step 345). The installer/uninstaller 330 writes the new flag 350 (ET=No) to the registry 305 (step 355) to the registry so the next patch received at the end user system 125 knows whether the new patch 315, after being installed, is to be uninstalled before being overwritten, which it does not in this example because it is not an engineering test patch as suggested by the associated flag.

While this invention has been particularly shown and described with references to preferred embodiments thereof, it will be understood by those skilled in the art that various changes in form and details may be made therein without departing from the scope of the invention encompassed by the appended claims.

For example, the development code server 105, source control library 110, patch manager 115, and public repository 120 may be located on different machines or located in the same machine that is logically operating as indicated in FIG. 1. Further, it should be understood that some or all of the communications paths 130a-130d and 145a-145c may use standard or custom communications paths or protocols, including a TCP/IP communications protocol, for example, and may also use wired, wireless, or fiber optic communications paths or associated protocols. In addition to the company server(s), the company may also provide a firewall (not shown) through which communications from the end user system 125 may not pass and communications from the development software code server 105 may not pass. In this way, the public repository 120 may be the only interface through which the end user system 125 can receive software patches, including engineering test code. This may help facilitate preventing the state of software in the end user system 125 from becoming unknown to the patch manager 115.

It should be understood that the patch manager 115 may be used to maintain a record of the temporary patch, archive the temporary patch, or maintain a state of a patchable system into which a temporary patch is installed (i.e., track a known state of the software used in the end user system 125). This information may be used by the patch manager to uninstall the temporary patch, thereby allowing future installing of other patches.

The flow diagram of FIG. 2 is an exemplary flow diagram and some of the steps described in reference thereto may occur in other orders, other ways, or not at all. For example, notification back to engineering (step 230) or notification of posting to the public repository (step 225) from the engineering server 105 to the end user system 125 (step 235) may occur by the end user's navigating to a website to learn of the posting or the engineer may use a telephone to call the end user of the posting. It should also be understood that other computer systems or processes may be employed in the embodiments described hereinabove in reference to FIGS. 1 and 2 without departing from the principles of the present invention.

In FIG. 3, logic for determining whether a patch (e.g., engineering test, engineering special, or service release) may be overwritten or first uninstalled may reside or be executed at the end user system 125 apart from the software receiving the patches or integral with the software, at an installer transmitted with the patch from the public repository 120 to the end user system 125, at a secure location elsewhere on a network accessible by the end user system 125, or combinations thereof. A flag or other indicator on which the logic makes its decisions may be stored (i) in the patches themselves at the end user system 125 or (ii) in a register or similar mechanism (a) at the end user system 125 or (b) apart from the end user system 125, such as in the public repository 120 or other network node accessible by the end user system 125.

What is claimed is:

1. A method for managing deployment of a software patch, comprising:
   creating a temporary software patch comprising at least one file that represents software code to change a state of files or settings of an end user system, the temporary software patch known to be a patch in the presence of which other software patches are not to be installed without uninstalling the temporary software patch;
   associating information with the temporary software patch that: i) indicates that after the temporary software patch is installed, the state of the files or settings of the end-user system is an unknown state and the temporary software patch should not be installed over, and ii) prevents the software patches from being installed over the temporary software patch from the unknown state;
   enabling the state of the files or settings of the end-user system to return from the unknown state to a prior known state, which is a state of the files or settings of the end-user system before the temporary software patch was installed, to enable the software patches to be installed from the prior known state; and
   based on the state indicated by the information associated with the temporary software patch, determining whether the software patches can be installed over the temporary software patch to manage deployment of the temporary software patch.

2. The method according to claim 1 wherein the information is stored in a location that an installer used to install the software patches accesses to determine whether a software patch may be installed without first uninstalling the temporary software patch.

3. The method according to claim 1 further including receiving the temporary software patch from a software patch manager.

4. The method according to claim 1 wherein the temporary software patch includes diagnostic software.

5. The method according to claim 1 wherein the temporary software patch includes software to correct software errors in a software program.

6. The method according to claim 1 further including maintaining a record of the temporary software patch.

7. The method according to claim 1 further including archiving the temporary software patch.

8. The method according to claim 1 further including maintaining a state of a patchable software system into which the temporary software patch is installed.

9. The method according to claim 1 further including facilitating uninstalling of the temporary software patch.

10. An apparatus for managing deployment of a software patch, comprising:
   a software patch manager that:
   1) creates a temporary software patch comprising at least one file that represents software code to change a state of files or settings of an end user system, the temporary software patch known to be a patch in the presence of which other software patches are not to be installed without uninstalling the temporary software patch;
   2) associates information with the temporary software patch that: i) indicates that after the temporary software patch is installed, the state of the files or settings of the end-user system is an unknown state and the temporary software patch should not be installed over, and ii) prevents the software patches from being installed over the temporary software patch from the unknown state; and
   3) enables the state of the files or settings of the end-user system to return from the unknown state to a prior known state, which is a state of the files or settings of the end-user system before the temporary software patch is installed, to enable the software patches to be installed from the prior known state;
   4) determines whether the software patches can be installed over the temporary software patch based on the state indicated by the information associated with the temporary software patch to manage deployment of the temporary software patch;
   the software patch manager being in communication with a development software code server to receive the software code via a communication path from a location where software engineers stored developed software code; and
   a transmitter in communication with the software patch manager that transmits the temporary software patch via a communication path to a deployment location.

11. The apparatus according to claim 10 wherein the information is stored in a location that an installer used to install the software patches accesses to determine whether a software patch may be installed without first uninstalling temporary software patch.

12. The apparatus according to claim 10 further including a source control library and wherein the software patch manager receives the files without the files passing through the source control library.

13. The apparatus according to claim 10 wherein the temporary software patch includes diagnostic software.

14. The apparatus according to claim 10 wherein the temporary software patch includes software to correct software errors in a software program.

15. The apparatus according to claim 10 wherein the software patch manager maintains a record of the temporary software patch.

16. The apparatus according to claim 10 wherein the software patch manager archives the temporary software patch.

17. The apparatus according to claim 10 wherein the software patch manager maintains a state of a patchable software system into which the temporary software patch is installed.

18. The apparatus according to claim 10 wherein the information associated with the temporary software patch facilitates uninstalling the software patch.

19. A method of providing software services to a customer, comprising:
   writing software code responsive to information provided by a customer in connection with a software system, the software code written to change a state of files or settings of the software system, the software code known to be code in the presence of which other software code are not to be installed without uninstalling the software code;
   presenting the software code to the customer in a temporary software patch that includes information that: i) indicates that after the temporary software patch is installed, the state of the files or settings of the end-user system is an unknown state and the temporary software patch should not be installed over, ii) prevents the software patches from being installed over the temporary software patch from the unknown state, iii) enables the state of the files or settings of the end-user system to return from the unknown state to a prior known state, which is a state of the files or settings of the end-user system before the temporary software patch is installed, to enable the software patches to be installed from the prior known state, and iv) enables the software code, temporary software patch, files, end-user system, or the software patches to determine whether the software patches can be installed over the temporary software patch based on the state indicated by the information included with the temporary software patch to manage deployment of the temporary software patch.

* * * * *